March 31, 1953 G. E. ARMINGTON 2,633,366
TRACTOR WEIGHT TRANSFER DEVICE
Filed Feb. 20, 1948
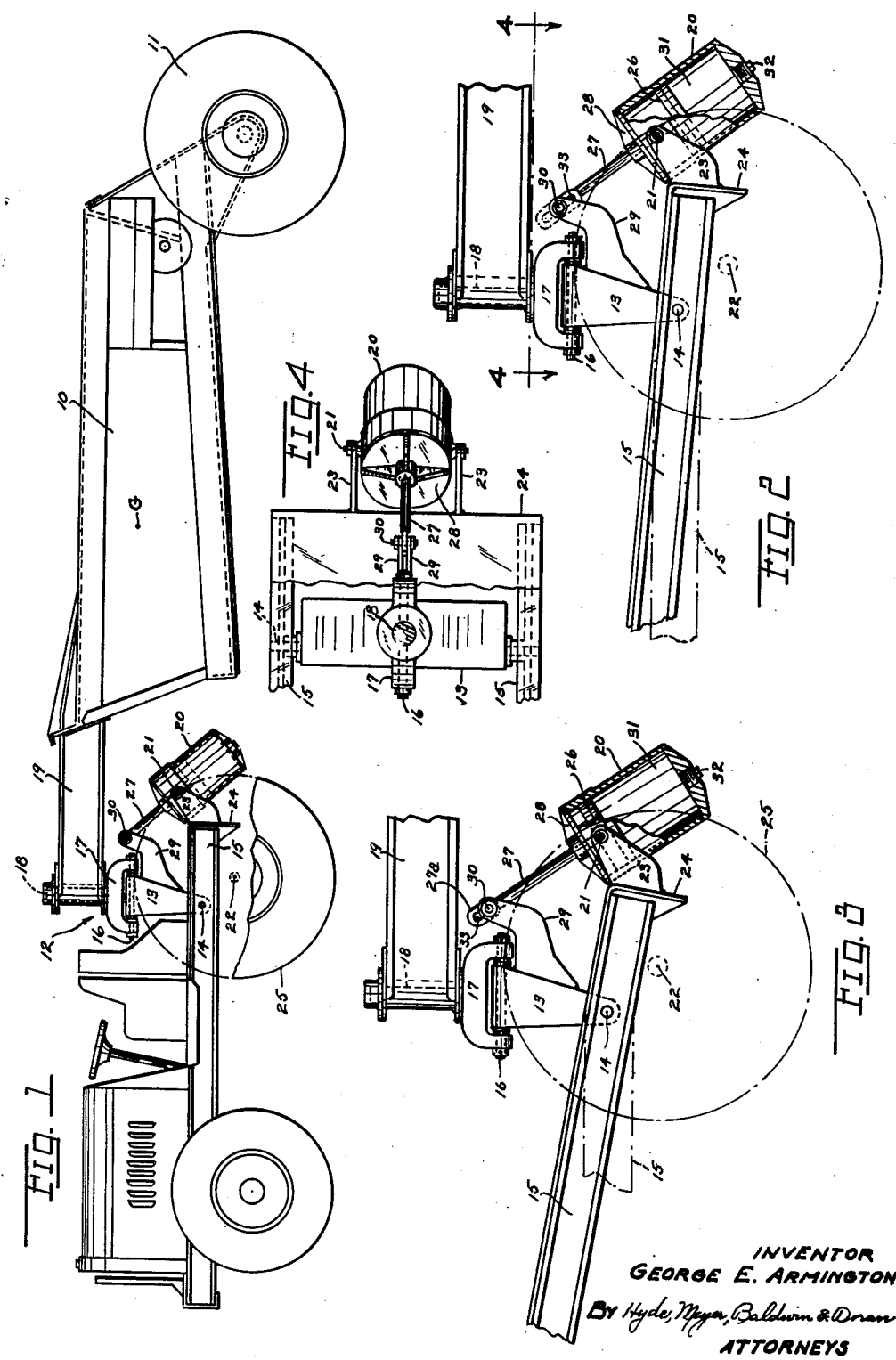
INVENTOR
GEORGE E. ARMINGTON
BY Hyde, Meyer, Baldwin & Doran
ATTORNEYS Patented Mar. 31, 1953

2,633,366

UNITED STATES PATENT OFFICE 2,633,366

TRACTOR WEIGHT TRANSFER DEVICE

George E. Armington, South Euclid, Ohio, assignor to The Euclid Road Machinery Co., Euclid, Ohio, a corporation of Ohio Application February 20, 1948, Serial No. 9,885

2 Claims. (Cl. 280—33.2)

The invention relates to an improvement in heavy duty, load moving vehicles of the tractor-trailer type.

In a familiar embodiment of a vehicle of this nature, the forward end of the trailer load is applied at a support point near the rear end of the tractor. An object of the invention is to provide novel and improved means whereby the load may be distributed, in predetermined proportions, between the front and rear wheels of the tractor.

A further object of the invention is to provide means for transferring a substantial portion of the weight from the front wheels of the tractor to the rear wheels thereof whereby to increase the tractive effect of the drive wheels.

A further object of the invention is to minimize the tendency of a tractor to "rear up" on its driving wheels under extreme torque application with a heavy load.

A further object of the invention is to provide weight transfer means whereby the driver may suitably apportion the tractor-borne load between the front and rear wheels thereof, so as to promote a greater stability of the vehicle on sharp grades.

Other objects and advantages of the invention will be apparent from a study of the following specification, in conjunction with the accompanying drawings, in which:

Fig. 1 is a side elevational view of a tractor-trailer combination embodying my invention;

Fig. 2 is a somewhat enlarged, fragmentary view of a portion of the structure shown in Fig. 1, parts being broken away and in section;

Fig. 3 is a view similar to Fig. 2, but showing parts in a different operating position;

Fig. 4 is a view taken on the line 4—4 of Fig. 2.

Fig. 1 shows a bottom dump trailer 10 supported at its rear end on a pair of wheels 11 and at its front end on trailer hitch means generally indicated by the reference character 12. The general features of the trailer hitch mechanism here shown are fully disclosed in my U. S. patent, No. 2,233,193, issued February 25, 1941, to which reference may be had if desired or necessary. Briefly, a bridge member 13 is supported, for fore and aft rocking movement, on a cross bar 14 supported at its ends in the tractor side frame members 15. The bridge carries a bar 16 disposed parallel to frame members 15, and serving as a pivot axis for a yoke 17. The yoke in turn carries a vertical shaft 18 upon which the trailer draw bar 19 is pivotally carried. The hitch means so far described is more fully discussed in my aforesaid patent, and it will be apparent that it is a universal joint effective in three dimensions. The bar 16 is substantially in alignment with the center of gravity of the loaded trailer, said center being here approximately indicated by the point G.

The means whereby weight transfer is effected will now be described.

A pneumatic cylinder 20 is carried on a pivotal axis 21 on the rear end of the tractor frame members 15. The pivotal axis 21 is parallel to the axis of rotation 22 of wheels 25, namely the center line of the rear axle (not shown), and the axis 21 may be anywhere rearwardly of axis 22 for the proper application of the leverage system to be described. In the present embodiment the cylinder is mounted on trunnions in the arms 23 of a bracket fixed on a cross plate 24 on the tractor rear end, so that the piston is rockable in a plane between and parallel to the planes of the rear wheels 25.

A piston 26 is reciprocable in cylinder 20, and a piston rod 27 is operatively attached to the piston and extends upwardly through a suitable aperture in the piston head 28. A bracket 29 is fixed to bridge 13, and a pin 30 is transversely fixed to the bracket. The end 27a of the piston rod is perforated as shown in Fig. 1 or slotted as shown in Figs. 2 and 3 to receive pin 30. The piston, rod and cylinder constitute a linkage the overall length of which may be changed to vary the angular relationship between bridge 13 and frame 15.

It will be apparent that if air be pumped into compression chamber 31 of cylinder 20, through any suitable valved fitting 32, the piston and piston rod will first move upwardly, the movement being indicated as from the full line position to the dot-dash line position of the slotted end of the connecting rod 27 as shown in Fig. 2. As soon as the bottom of the slot 33 abuts pin 30, the effect of further admission of compressed air is to apply downward pressure on the cylinder's trunnion axis 21, and consequently against the rear end 24 of the frame. The significance of the lost motion connection provided by the slot and pin connection will later be more fully described.

The pivotal axes 30 and 14 are fixed with respect to each other, and to the fully loaded trailer. The downward pressure, described in the preceding paragraph, effective on or near the rear end of the tractor frame, tends to tilt the tractor frame around axis 14, so as to increase the downward application of load on the rear axle of the tractor, while relieving the load on the tractor front axle. Movement of the frame 15 from the broken line position to the full line position of Figs. 2 and 3 as a result of increasing pneumatic pressure in cylinder pressure head 31, is greatly exaggerated in the drawings, since actually the front wheels of the tractor do not leave the ground, the final object being to transfer only a predetermined portion of the weight from the front wheels to the rear wheels. The vertical movements of the front and rear frame ends are opposite in direction, and relatively quite small. The rear axle may be considered as one of the fixed abutments for the leverage system just described.

In one commercial application of the invention to a tractor-trailer assembly, the weight on the front wheels of the tractor was varied from 9000 lbs. to 4000 lbs., the differential of course being applied to the rear wheels so as to increase the tractive friction thereof.

Rocking of the tractor and trailer in traveling over rough terrain is counteracted by the shock absorbent effect of the air in the pressure head 31 of the cylinder 20, since movement of the piston responds to rocking of the tractor frame.

If under extreme torque conditions, or in travel over a suddenly encountered rise, the front end of the tractor "rears" or tilts, the consequent sudden downward movement of cylinder 20 relative to piston 26 reduces the air pressure therein. As will be understood from what has been previously described, reduction in cylinder pressure produces the effect of sudden transfer of weight from the rear axle to the front axle, and counteracts the "rearing" tendency of the tractor.

The slot 33 in the upper end of piston rod 27 is not always used, as Fig. 1 will show. When used it helps to counteract the effect produced when the front tractor wheels encounter a sharp grade. This tilts the tractor frame towards or past the full line position of Fig. 3, carrying the cylinder downwardly relative to the piston. When the piston and cylinder reach approximately the position shown in Fig. 3, the slotted end 27a of the piston rod begins to travel downwardly on pin 30, thereby compensating for a substantial additional amount of frame tilting beyond that taken care of by travel of the piston in the cylinder. This avoids the necessity of making the cylinder longer. Under practically all normal working conditions the bottom of the slot 33 is forced upwardly against the pin 30 by the air pressure in pressure head 31.

Under known conditions of terrain and working loads, the operator may apportion the load in accordance with his experience as to what he needs in traction, stability, or other requirements which he regards as desirable or necessary. Since such weight apportionment depends on the air pressure in pressure head 31, the operator may at any time determine the approximate situation by the use of a portable air-gage applied at intake point 32.

What I claim is:

1. In a tractor-trailer combination of the character described wherein said trailer is provided with a draw bar, and wherein an upwardly extending draw bar support is pivotally attached near the rear end of the tractor frame, and is hitched to said draw bar, novel weight transfer means operatively engaging both said frame and said support, said transfer means comprising a cylinder pivotally attached to the rear end of said frame and swingable in a fore-and-aft vertical plane, a piston reciprocable in said cylinder responsive to variations in fluid pressure in the pressure head of said cylinder, a rod having one end connected to said piston and the other end having a lost motion connection to said support at a point above the pivotal connection of said support with said frame, and means for admitting fluid pressure to said pressure head whereby to vary the relative angularity between said draw bar support and said frame, and consequently vary the load carrying relationship of the front and rear ends of said frame.

2. A tractor-trailer combination of the character described comprising a tractor frame, a trailer draw bar, a bridge support pivotally carried on said frame near its rear end and extending upwardly to engage said draw bar, a fluid pressure cylinder mounted on the rear end of said frame and disposed pivotally to be swingable fore-and-aft in a vertical plane, a transverse pin carried by said bridge support, a piston reciprocable in said cylinder and having connected thereto a rod, the remote end of which is slotted to receive said pin in lost motion connection, reciprocation of said piston being responsive to variation of fluid pressure in the pressure head of said cylinder, means for admitting fluid pressure to said pressure head whereby to vary the overall distance between the pivotal axis of the cylinder and said pin and consequently to vary the angularity between said frame and said bridge support so as to change the load carrying relationship of the front and rear ends of said frame.

GEORGE E. ARMINGTON.

REFERENCES CITED

The following references are of record in the file of this patent:

UNITED STATES PATENTS

| Number | Name | Date |
|---|---|---|
| 2,307 | Bissell | Oct. 11, 1841 |
| 1,908,711 | Kuchar | May 16, 1933 |
| 1,933,387 | Patterson | Oct. 31, 1933 |
| 2,360,901 | Simmons | Oct. 24, 1944 |
| 2,374,410 | Brumbaugh | Apr. 24, 1945 |
| 2,501,721 | Hagenah | Mar. 28, 1950 |